Nov. 14, 1961   C. E. MEESE ET AL   3,008,206
HOSE CLAMP
Filed Aug. 20, 1959
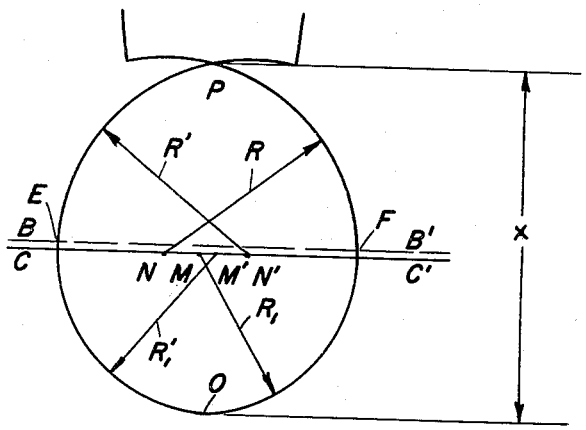
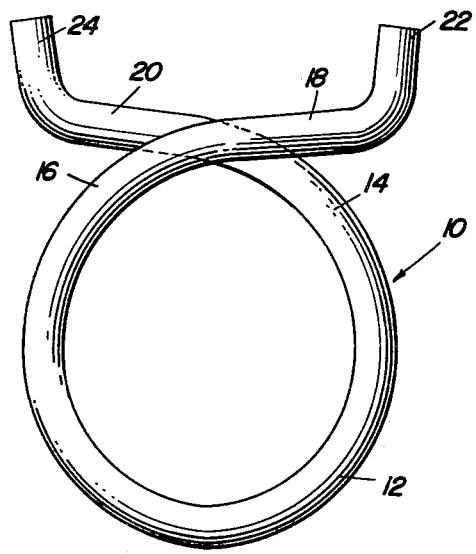
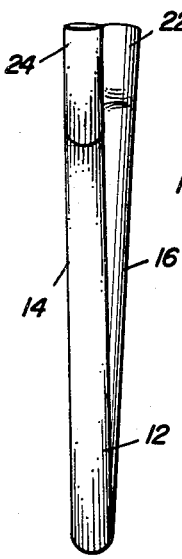
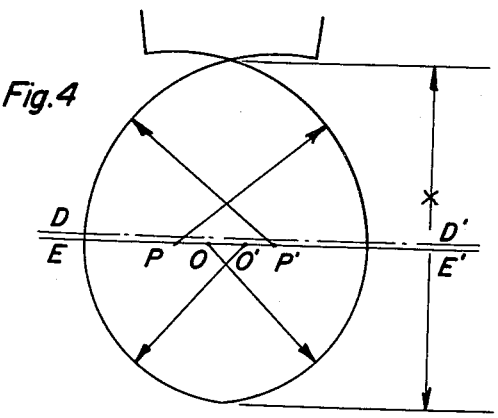
Clarence E. Meese
Ronald R. Meese
INVENTORS

United States Patent Office 3,008,206
Patented Nov. 14, 1961

3,008,206
HOSE CLAMP
Clarence E. Meese, 413 St. Clair Ave. SW., and Ronald R. Meese, Blake St., both of New Philadelphia, Ohio, assignors of twelve and one-half percent to Naomi M. Streb and twelve and one-half percent to Joseph M. Streb, both of Dover, Ohio
Filed Aug. 20, 1959, Ser. No. 835,014
1 Claim. (Cl. 24—27)

The present invention generally relates to a hose clamp and more particularly to a novel structural arrangement in a self-tightening or self-contracting spring wire hose clamp and is primarily concerned with certain improvements over that type of device shown in Patent No. 2,793,414 granted May 28, 1957.

It is the general object of the present invention to provide a self-tightening or self-contracting spring wire-type hose clamp in which the upper and lower sections of the clamp are formed about radii having a center disposed below the true center of the clamp.

The present invention incorporates a construction in which the lower section of the hose clamp is formed about two radii disposed on spaced centers in a horizontal plane below the center plane whereby the clamping force exerted by the clamp may be controlled without changing the over-all diameter of the clamp by virtue of changing the orientation of the side portions of the clamp.

A further feature of the present invention is the formation of the clamp in a manner described hereinafter so that the die forming the clamp is actually elliptical or out of round so that when the hose clamp is removed from the die and "snaps back" as will occur with this type of material, the lower half of the hose clamp will be semi-circular with the upper half still formed on two radii having a center below the center plane.

Another feature of the present invention is to provide a hose clamp which is extremely simple in construction, easy to install, adjustable as to its clamping force and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view illustrating the manner in which the hose clamp of the present invention is formed;

FIGURE 2 is a side elevational view of a hose clamp constructed in accordance with the present invention in fully contracted position;

FIGURE 3 is an end elevational view of the construction of FIGURE 2; and

FIGURE 4 is a diagrammatic view of the hose clamp showing an arrangement in which the sides have been drawn in slightly.

As is set forth in the previously mentioned Arras Patent No. 2,793,414, hose clamps of this nautre are formed of wire stock and in application of the clamp, it is expanded and placed around the hose and released so that its inherent spring force will contract the clamp upon the hose to secure the same to a rigid tube, pipe or the like.

In order to have a successful clamp, it is desirable to have the clamp apply substantially uniform force around the circle of predetermined diameter. Further, it is desirable that the force applide by the clamp can be varied for a given predetermined diameter by varying certain characteristics of the clamp thereby enabling the clamp to be used with relatively high pressures.

The hose clamp as shown in FIGURES 2 and 3 includes a length of wire which is generally designated by numeral 10 which has substantially a circular cross-section and which may be said to have a lower body portion 12 and a pair of upper body portions 14 and 16 which are continuous with the lower body portion 12. The arms 14 and 16 cross each other at the top of the clamp in a vertical plane which substantially intersects the band. The arms or body portions 14 and 16 have projecting ends 18 and 20 which terminate in outturned end portions 22 and 24. It is noted that the upper body portions or arms 14 and 16 extend in such a manner that the portions 18 and 20 form an acute included angle with a horizontal plane passing through the point of intersection of the arms or body portion 14 and 16 when in the relaxed state as illustrated in FIGURE 2 and, of course, the included angle will increase as the outturned end portions 22 and 24 are moved towards each other by a suitable tool for applying and removing the clamp.

While it has been the object of prior patents to provide the lower body portion 12 as substantially semi-circular, this actually has not been accomplished due to a quality of the material from which the hose clamp is made. This characteristic is known as "snap back." In other words, when the clamp is formed in the die and removed therefrom, the clamp will then assume a position slightly different from the position that it was in when in the die due to the tendency of the clamp to return to its normal position because of its natural inherent resiliency.

In order to overcome this problem, the present invention incorporates an arrangement in which the die is formed in a particular manner to form the hose clamp in a particular manner. In this invention, the upper and lower body sections are formed below the true center plane of the clamp designated in FIGURE 1 by the reference line B—B'. As illustrated, the upper and lower sections are formed by radii having a center on the center plane designated by reference line C—C' which is below the true center plane B—B'.

The radii of the upper sections of the body designated by R and R' have their centers on the center plane C—C' at points N and N'. The radii forming the lower body section 12 are designated by $R_1$ and $R_1'$, and have their centers at points M and M' on the center plane C—C' which is below the true center plane B—B'.

The radii are arranged that they will blend with each other at points O and P with it being possible to change the length of the radius by drawing in the sides of the clamp without changing the distance X which has to remain constant for a predetermined diameter with the change in radii providing for control of the clamping force while yet permitting the clamp to open to the same degree without permanently distorting the clamp.

In one particular form of this invention, the center plane C—C' is dropped below the center plane B—B' a distance of fifteen thousandths of an inch to form the upper section. By forming the upper section this way, there is gained a two-to-one ratio in the upper section. By forming the lower section on the plane C—C', another two-to-one ratio in the lower section is obtained. By forming the lower sections at points M—M' and blending the points at O and P, there are gained fifteen thousandths of an inch at points E and F in making the clamp smaller without changing the distance X at any time. Thus, there is gained an actual reduction of sixty thousandths of an inch smaller total circumferential distance which accounts for the four-to-one ratio since the plane C—C' was dropped only fifteen thousandths of an inch. Thus, this provides an accurate control of the pressure exerted by the clamp for a given predetermined diameter without changing the distance X.

FIGURE 4 has been included to amplify the change made by drawing in the side edges of the clamp without reducing the distance X by dropping the points of origin of the radii to a point below the true center plane of the device. Since the two side sections of the hose clamp pivot about a point generally at the bottom of the clamp when spread apart, it is necessary that the X distance remain constant for a predetermined diameter hose and pipe so that a true circle is provided when the clamp is applied with an equal pressure being applied throughout the circumference.

In actual comparative tests between the present structure and devices manufactured under Golden Patent No. 2,685,719 and Arras Patent No. 2,793,414, it has been found that the formation of the hose clamp with the centers as set forth in FIGURES 1 and 4, results in a more effective clamping action so that greater pressures may be held with the device disclosed herein. In the Arras and Golden patents, the only way that the clamping force could be changed is by changing the resilient characteristics of the hose clamp or in other words increasing the Rockwell hardness member to a point where the hose clamp is somewhat brittle which, of course, increases the clamping force to a certain degree but also increases the occurrence of breakage and possible resultant injury due to such breakage while under tension. In this device the "snap back" will cause the lower section of the body to be semi-circular and the upper section still forms on two radii below the center plane. Due to the snap back action, it is impossible to obtain a semi-circular bottom section unless this section is formed on two separate radii. Thus, the dies for forming the hose clamp are actually elliptical and are formed in accordance with the showing in FIGURES 1 and 4, and when the hose clamp is removed from the dies, the snap back of the lower section causes the lower section to assume a semi-circular condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

A self-tightening hose clamp for application for a predetermined diameter and comprising a length of wire formed as a resilient band having a bottom generally semi-circular body portion formed on two radii having horizontally spaced centers lying on a plane disposed below the true center plane of the clamp, said band having a top body portion comprising a pair of similar partial circular sections formed as extensions of the bottom body portion on two radii having centers disposed in horizontally spaced relation on the same horizontal plane disposed below the true center plane of the clamp, the free ends of said partial circular sections disposed in crossing relation to each other and having extending portions disposed in acute angular relation to a horizontal plane extending through the point of intersection of the partial circular sections.

References Cited in the file of this patent

UNITED STATES PATENTS 2,793,414     Arras _____ May 28, 1957

FOREIGN PATENTS 23,081     Great Britain _____ 1893